(12) United States Patent
Kurt et al.

(10) Patent No.: US 9,169,997 B2
(45) Date of Patent: Oct. 27, 2015

(54) ARRANGEMENT FOR SPOT ILLUMINATION

(75) Inventors: Ralph Kurt, Eindhoven (NL); Teunis Willem Tukker, Eindhoven (NL); Mark Eduard Johan Sipkes, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 13/821,056

(22) PCT Filed: Sep. 5, 2011

(86) PCT No.: PCT/IB2011/053873
§ 371 (c)(1),
(2), (4) Date: Mar. 6, 2013

(87) PCT Pub. No.: WO2012/032455
PCT Pub. Date: Mar. 15, 2012

(65) Prior Publication Data
US 2013/0155671 A1 Jun. 20, 2013

(30) Foreign Application Priority Data

Sep. 10, 2010 (EP) .................................. 10176142

(51) Int. Cl.
*F21V 7/09* (2006.01)
*F21V 13/04* (2006.01)
*F21K 99/00* (2010.01)
(Continued)

(52) U.S. Cl.
CPC . *F21V 13/04* (2013.01); *F21K 9/00* (2013.01); *F21V 5/008* (2013.01); *F21V 5/04* (2013.01); *F21V 7/0025* (2013.01); *F21V 7/043* (2013.01); *F21V 7/09* (2013.01); *F21V 14/06* (2013.01); *G02B 19/0028* (2013.01); *G02B 19/0066* (2013.01); *F21W 2131/406* (2013.01);
(Continued)

(58) Field of Classification Search
CPC ....... F21V 13/04; F21V 14/06; F21V 14/065; F21V 7/0025; F21V 7/0033; F21V 7/0066; F21V 7/0075; F21V 7/043; F21V 7/048; F21V 7/09; F21V 5/04; F21V 5/048; F21V 17/02; F21Y 2105/001; F21Y 2113/005
USPC ......... 362/239, 242, 243, 245, 280, 281, 304, 362/305, 296.1, 311.12
See application file for complete search history.

(56) References Cited

U.S. PATENT DOCUMENTS 1,928,564 A * 9/1933 Jackson ........................ 362/346
5,068,768 A * 11/1991 Kobayashi .................... 362/539
(Continued)

FOREIGN PATENT DOCUMENTS

GB 2374919 A 10/2002
JP 3064406 A 6/1991
(Continued)

*Primary Examiner* — Y M Lee
(74) *Attorney, Agent, or Firm* — Yuliya Mathis

(57) ABSTRACT

There is provided an arrangement for spot illumination (14). The arrangement provides an improved collimation and color mixing unit comprising a LED array (1), a convex shaped reflector (15a), a field lens (21) and an additional cylindrical reflector (15b) at the exit aperture of the system. In combination with an optical projection system which may comprise at least two additional zoom lenses and a gate (in which several maskers, gobos or shutters could be inserted) the system allows color mixing in an extended operational range including out of focus zoom settings often used to get soft edge spots.

17 Claims, 6 Drawing Sheets

(51) Int. Cl.
*F21V 5/00* (2015.01)
*F21V 5/04* (2006.01)
*F21V 7/00* (2006.01)
*F21V 14/06* (2006.01)
*G02B 19/00* (2006.01)
*F21V 7/04* (2006.01)
*F21W 131/406* (2006.01)
*F21Y 105/00* (2006.01)
*F21Y 113/00* (2006.01)
*F21Y 101/02* (2006.01)

(52) U.S. Cl.
CPC ........ *F21Y2101/02* (2013.01); *F21Y 2105/001* (2013.01); *F21Y 2113/005* (2013.01)

(56) References Cited

U.S. PATENT DOCUMENTS

| | | | |
|---|---|---|---|
| 6,200,002 B1* | 3/2001 | Marshall et al. | 362/296.05 |
| 6,809,869 B2* | 10/2004 | Hough | 362/268 |
| 6,832,845 B1 | 12/2004 | Kretzschmar et al. | |
| 7,731,388 B2* | 6/2010 | Hoelen et al. | 362/311.12 |
| 8,070,328 B1* | 12/2011 | Knoble et al. | 362/311.02 |
| 2005/0168986 A1 | 8/2005 | Wegner | |
| 2008/0030974 A1 | 2/2008 | Abu-Ageel | |
| 2008/0084701 A1* | 4/2008 | Van De Ven et al. | 362/362 |
| 2009/0231856 A1 | 9/2009 | Householder et al. | |
| 2010/0046233 A1 | 2/2010 | Chou et al. | |

FOREIGN PATENT DOCUMENTS

| | | |
|---|---|---|
| JP | 6068208 A | 3/1994 |
| JP | 2007123160 A | 5/2007 |
| JP | 2009129794 A | 6/2009 |
| WO | 0058664 A1 | 10/2000 |
| WO | 0250472 A1 | 6/2002 |
| WO | 2006105646 A1 | 10/2006 |
| WO | 2006405646 A1 | 10/2006 |
| WO | 2010146499 A1 | 12/2010 |
| WO | 2010146516 A1 | 12/2010 |

* cited by examiner

ARRANGEMENT FOR SPOT ILLUMINATION

FIELD OF THE INVENTION

The present invention relates in general to an arrangement for spot illumination. More particularly the present invention relates in general to an arrangement for spot illumination having a tubular reflector with two sections.

BACKGROUND OF THE INVENTION

Colored light is used in many applications where scene setting and atmosphere creation is important. Examples of applications exist inter alia in the fields of theatre lighting, architecture lighting (inter alia for city beautification), shops, hotels, restaurants, hospitals, schools, office spaces. Today this is mostly accomplished by combining white light sources with colored filters in order to obtain desired colors.

As an alternative, systems with multi-colored LEDs can be used. Such systems are attractive because they generate the desired colors without filters. This has an efficiency advantage and, more importantly, colors can be changed by the electronics: there is no need to change filters in order to change color; all colors are directly available by combining inter alia a number LEDs of different prime colors. Having electronically regulated colors allows various automatic programming methods to be used to control the lighting system and the fact that filters are omitted results in easier supply chain (no filters needs to be removed) and color consistency (replaced filter might introduce variation). The market for these systems is quickly growing as LED performance improves.

In multi-channel, high flux LED applications such as e.g. CDM replacement spots and multi-color entertainment spots (for theatre/touring/stage/studio applications) a large number of LEDs may be needed and the LEDs should be packed on a small array in a robust way. The performance of an assembly of individual LED packages, such as Rebels, is often limited. On the other hand dedicated large LED arrays, such as fabricated by the company Enfis, LEDEngine have intrinsically a low yield and they are too expensive for many applications. There is thus a need for a scalable solution than can be manufactured and/or assembled with a high yield and high alignment robustness.

U.S. 60/200,002 disclose a so-called collimating trumpet reflector, which provides excellent color mixing for a LED light source and efficient collimation for inter alia hard edge spot fixtures as used in theatre spots. However, lighting designers may wish to use the same fixture to project an out of focus diaphragm to get a soft edge. Particularly in stage lighting, there is often a need to create a controlled beam of light having sharp edges. This is often realized using a so called hard edge spot luminary (also called a profile lantern or an ellipsoidal profile spot). The hard edge spot luminary may comprise obstructions arranged in the optical path or axis, which obstructions can be projected onto a target surface by a lens or optics of the hard edge spot luminary. These obstructions may comprise shutters or a so called gobo, e.g., a piece of material with patterned holes through which light passes, which piece of material is placed in the beam of light such that only the desired 'shape' of light or pattern is passed through the piece of material, while the rest of the light is blocked, thereby achieving a specific shadow/light pattern in the illuminated plane. Often in the same application, there is additionally often a need or desire to create a wash beam, i.e. a beam of light having soft edges. This is often realized by bringing the lens or optics of the hard edge spot luminary out of focus, whereby soft edge effects can be provided. However, color mixing performance often deteriorates when the lens or optics of the hard edge spot luminary is brought out of focus, which may result in undesired color fringes in the shadow/light pattern projected onto the target surface, i.e. undesired fringes of color along boundaries separating bright and darker areas in the projected pattern.

SUMMARY OF THE INVENTION

It has been noticed that lighting systems according to prior art does not provide sufficient color mixing which may result in unacceptable color fringes. It is an objective of the current invention to provide an arrangement for spot illumination that can give a good color mixing and a homogeneous spot at any focusing settings of the arrangement. Further, it may be desirable to use the same arrangement also to generate a wash beam, in other words to project an out of focus diaphragm to get a soft edge.

Generally, the above objectives are achieved by an arrangement for spot illumination according to the attached independent claim. According to a first aspect of the invention, this and other objects are achieved by an arrangement for spot illumination, comprising a tubular reflector having a reflective inner surface, the tubular reflector comprising a first section having an entrance aperture and an exit aperture being larger than the entrance aperture, and a second section having an entrance aperture and an exit aperture being substantially identical in size, the entrance aperture of the second section being positioned adjacent the exit aperture of the first section; a light source array comprising a plurality of light sources arranged to emit light into the first section of the tubular reflector at the entrance aperture of the first section; and an optical focusing element arranged proximate the second segment of the tubular reflector, wherein the first section, the second section, the light source array and the optical focusing element thereby are arranged to form a collimated beam of homogeneous color mixed light to be outputted at the exit aperture of the second section.

Advantageously such an arrangement may provide a good color mixing and a homogeneous spot at any focusing settings of the arrangement. The same arrangement may also be used to generate a wash beam.

According to a second aspect of the invention, the above object and other objects are achieved by a luminaire comprising an arrangement as disclosed above.

According to a third aspect of the invention, the above object and other objects are achieved by light system, comprising an arrangement as disclosed above.

It is noted that the invention relates to all possible combinations of features recited in the claims. Thus, all features and advantages of the first aspect likewise apply to the second and third aspects, respectively.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
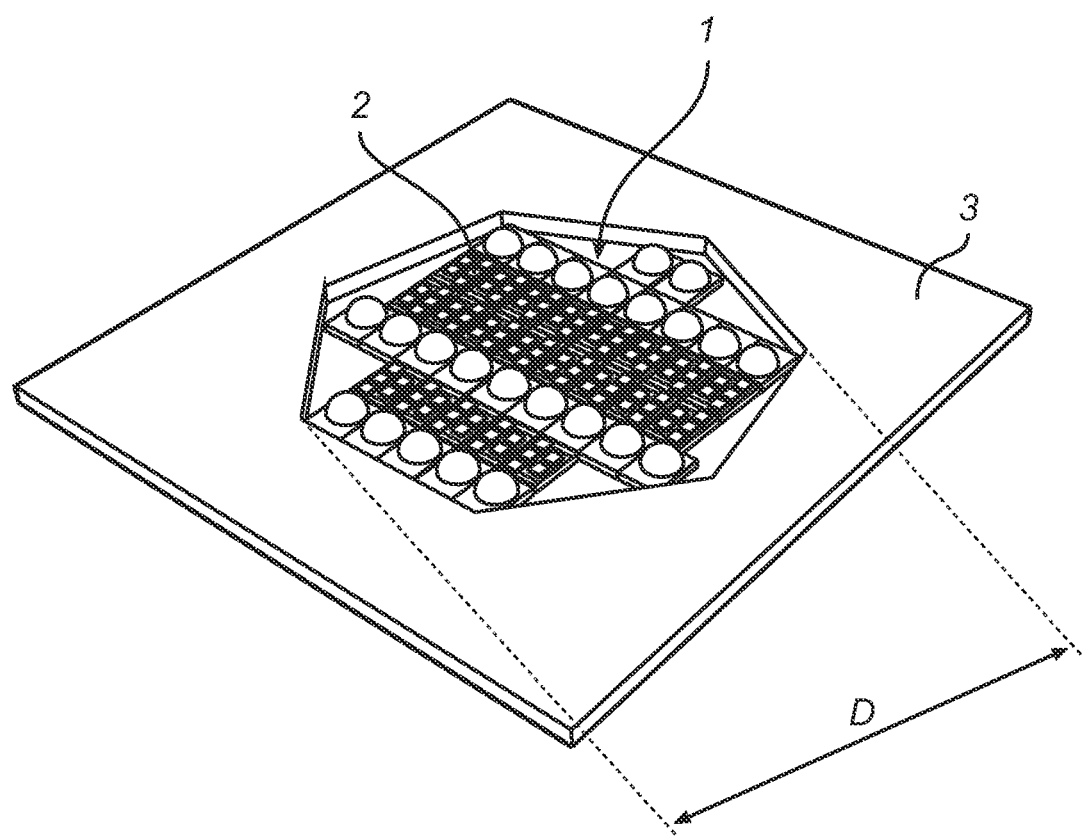
FIG. 1 illustrates an LED array according to an embodiment.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Multi-channel, high brightness LED light source platforms to serve the needs of various entertainment lighting applications (inter alia in the fields of theatre, touring and TV studios) are currently being developed. Such LED light source platforms may have a light output of about 10 000 lm and at least four different color channels (from a highly dense packed LED array with a diameter of less than 30 mm). Such a high brightness light source offers many advantages for spot applications. Especially it may allow to realize a hard edge spot (also referred as profile) together with on gel matching functionality. FIG. 1 illustrates a highly dense packed LED array 1. The illustrated LED array, which is attached to a substrate 3, has a diameter D of 29 mm and comprises six color channels and has 120 LEDs 2.

Figure 2:
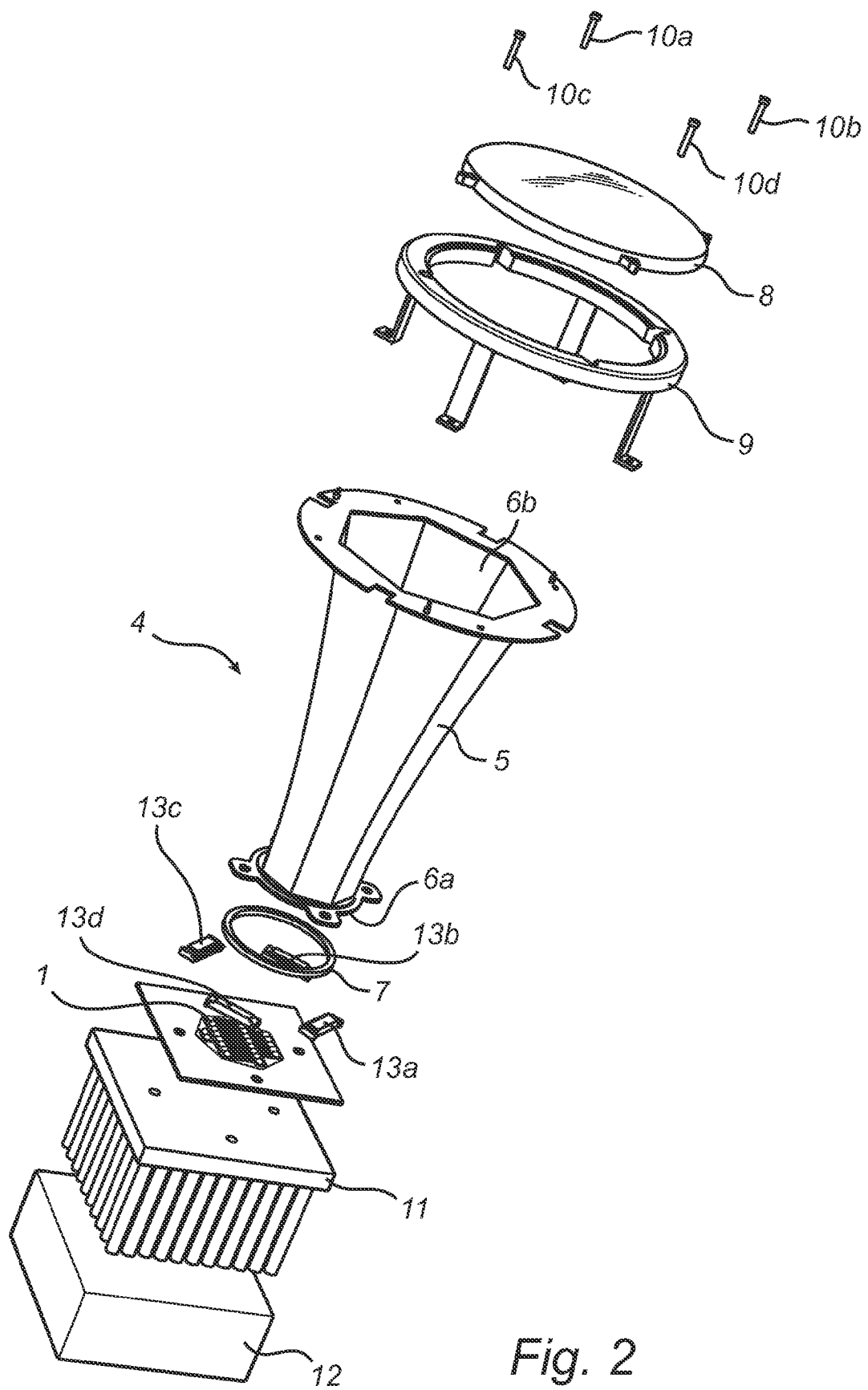
FIGS. 2-5 illustrate arrangements for spot illumination according to embodiments.

One or more LED arrays 1 as illustrated in FIG. 1 may be used in an illumination system for spot illumination. FIG. 2 is a perspective view of a high brightness LED light source based arrangement 4. The arrangement 4 is suitable for spot illumination. The arrangement comprises a highly dense packed LED array 1 and a mixing and/or collimating tubular reflector 5 (also known as a trumpet reflector). The tubular reflector 5 has an entrance aperture 6a and an exit aperture 6b. Light from the LED array 1 is received at the entrance aperture 6a and mixed and/or collimated light is emitted at the exit aperture 6b. According to the embodiment illustrated in FIG. 2 a first optical element 7 is attached to the entrance aperture 6a and a second optical element 8 is attached, via a ring 9, at the exit aperture 6b. The second optical element 8 may for example be fixed to the ring by means of a screw arrangement 10a-d or the like. The LED array 1 is operatively connected to a heat sink 11. Heat generated by the LED array 1 may thereby be transmitted from the LED array 1 to the heat sink 11. In turn the heat sink 11 is operatively connected to a fan 12. The fan 12 may provide forced air cooling. The LED array 1 may be electrically connected to a LED driver or the like by means of one or more electrical connector 13a-d.

Figure 3:
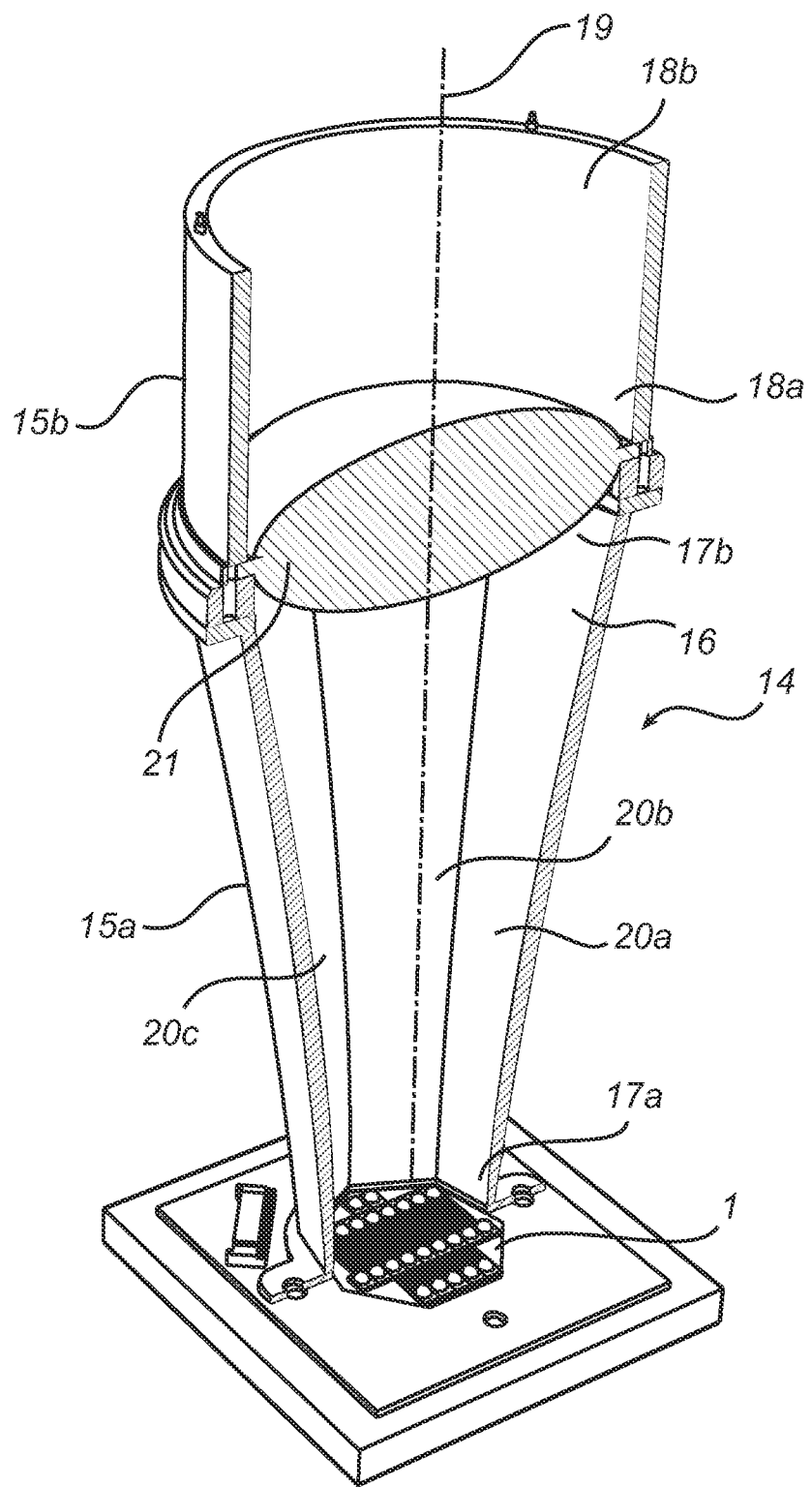

FIG. 3 is an exploded view of an arrangement 14 for spot illumination according an embodiment. The arrangement 14 of FIG. 3 is similar to the arrangement 4 of FIG. 2. The arrangement 14 comprises two sections 15a, 15b forming a tubular reflector (or trumpet reflector). The body of the tubular reflector may be fabricated from a polymeric material by assembly multiple pieces together or as a single piece inter alia by injection moulding or rapid prototyping. The tubular reflector has a reflective inner surface 16 so that light received by the tubular reflector is reflected at the reflective inner surface 16 and thereby results in output light emitted from the tubular reflector being mixed and/or collimated. For example, a highly reflective foil such as Miro foil may be attached (e.g. glued) onto the inner surface 16 of the tubular reflector.

In more detail the tubular reflector has two sections; a first section 15a and a second section 15b, each having a respective entrance aperture 17a, 18a and a respective exit aperture 17b, 18b. A light source array 1 may be arranged to emit light into the first section 15a of the tubular reflector at the entrance aperture 17a of the first section 15a. An optical axis 19 may thus be formed from the light source array 1 towards the exit aperture 18b of the second section 15b.

The tubular reflector may have a beam shaping functionality transforming the Lambertian light distribution from the light source array 1 into the required beam shape of 10°-40° FWHM) and providing color mixing. As noted above the first section 15a (of the tubular reflector) has an entrance aperture 17a and an exit aperture 17b. The first section 15a is preferably arranged and/or orientated such that incident light is received at the entrance aperture 17a and output light is emitted at the exit aperture 17b. The exit aperture 17b of the first section 15a is larger than the entrance aperture 17a of the first section 15a. According to a preferred embodiment the first section 15a has substantially a trumpet shape. More particularly, the first section 15a may have a convex shape as seen from the optical axis 19. The first section 15a may further comprise multiple facets 20a-c arranged to form a polygonal cross section along the optical axis 19. The entrance aperture 17a of the first reflector 15a may thus have a polygonal cross section, such as a hexagonal, a heptagonal or an octagonal cross section. In FIG. 3 the entrance aperture 17a of the first reflector 15a has a heptagonal cross section.

Likewise, as also noted above the second section 15b (of the tubular reflector) has an entrance aperture 18a and an exit aperture 18b. The second section 15b is preferably arranged and/or orientated such that incident light is received at the entrance aperture 18a and output light is emitted at the exit aperture 18b. According to an embodiment the second section 15b has substantially a cylindrical shape cross section as seen from the optical axis 19. However, according to another embodiment the second reflector 15b also has a polygonal cross section, preferably similar to the shape of the first section 15a of the tubular reflector. More particularly the second section 15b may have a cross section shape which corresponds to the cross section shape of the first section 15a.

The entrance aperture 18a of the second section 15b and the exit aperture 18b of the second section 15b are substantially identical in size. The wording "substantially identical in size" should here be interpreted as being different only within a predetermined margin (such as the diameters of the apertures in question not differing more than 1-5%, or being within factory specifications). In other words, the first section 15a may have a tubular shape whereas the second section 15b may have a cylindrical shape. The second section 15b and the first section 15a are preferably arranged such that the entrance aperture 18a of the second section 15b is positioned adjacent the exit aperture 17b of the first section 15a. Preferably the entrance aperture 18a of the second section 15b and the exit aperture 17b of the first section 15a have the same diameter and/or shape.

The arrangement 14 further comprises an optical focusing element 21. The optical focusing 21 element may be a field lens. Preferably the optical focusing element 21 is arranged proximate the second segment 15b of the tubular reflector. For example, the optical focusing element 21 may be attached to the second segment 15b. Alternatively the optical focusing element 21 and the second segment 15b may be separated by a ring (not shown) or another separating element(s). According to an embodiment optical focusing element 21 is arranged in the optical path (i.e. along the optical axis 19) tightly between the first section 15a (i.e. the tubular section of the reflector) and the second 15b section (i.e. the cylindrical section of the reflector), as is disclosed in the illustrative example of FIG. 3. More generally the optical focusing element 21 may be positioned between the entrance aperture 18a of the second section 15b and the exit aperture 17b of the first section 15a.

Figure 4:
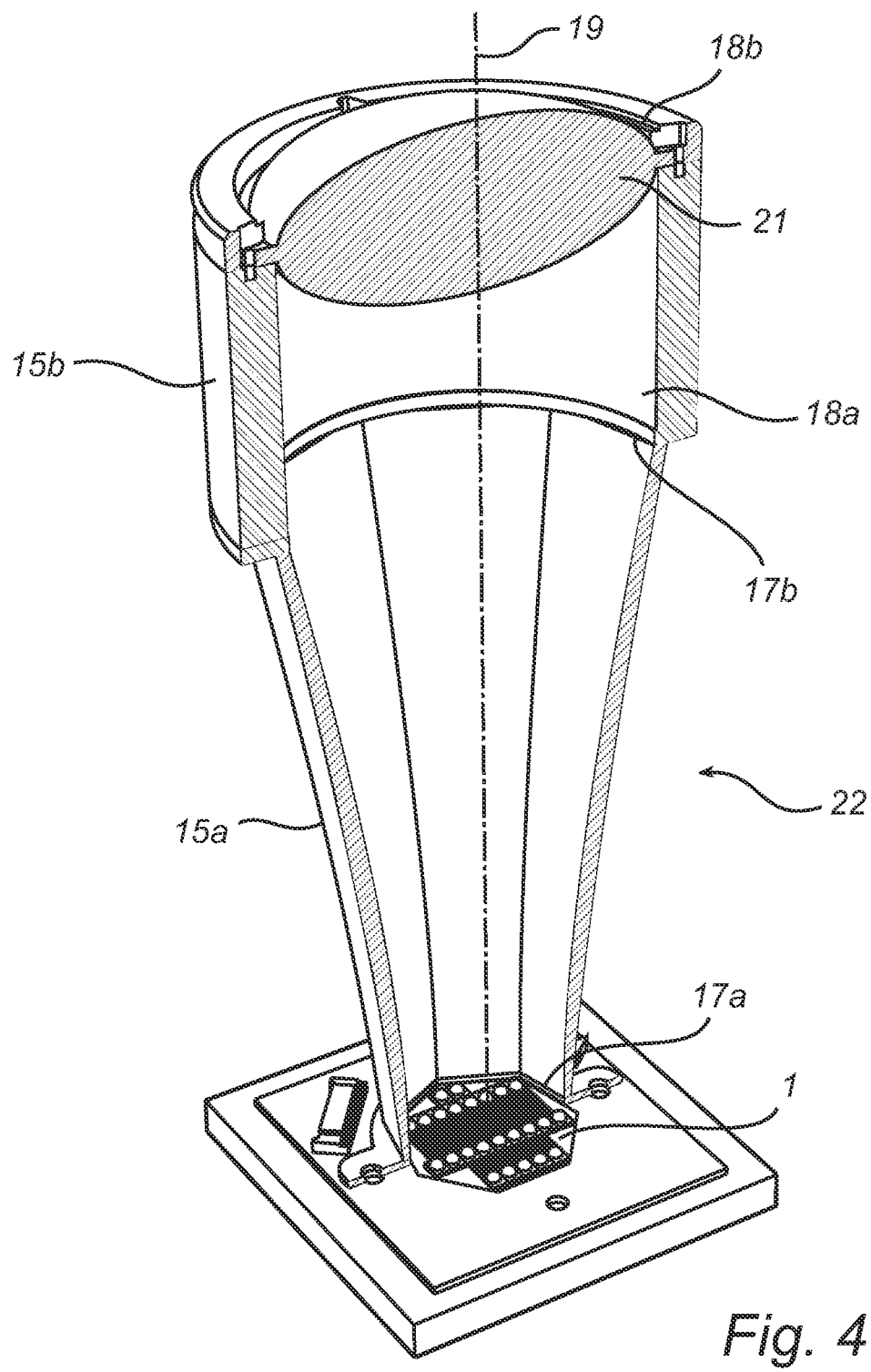

Other positions of the optical focusing element 21 are equally possible. The optical focusing element 21 may, for example, be positioned proximate the exit aperture 18b of the second section 15b of the tubular reflector. For example, the optical focusing element 21 may be positioned directly at the exit aperture 18b. Alternatively the optical focusing element 21 and the exit aperture 18b may be separated by a ring (not shown) or another separating element(s). Such an arrangement 22 is illustrated in FIG. 4. The arrangement 22 of FIG. 4 is thus similar to the arrangement 14 of FIG. 3. Hence the arrangement 22 comprises inter alia a light source array 1, a tubular reflector having a first section 15a and a second section 15b, where each one of the first section 15a and the second section 15b has an entrance aperture 17a, 18a and an exit aperture 17b, 18b, and an optical focusing element 21. An optical axis 19 is formed from the light source array 1 through the optical focusing element 21 towards the exit aperture 18b of the second section 15b.

As noted above the arrangements 14, 22 comprises a light source array 1 which comprises a plurality of light sources 2. The light source array 1 is arranged to emit light into the first section 15a of the tubular reflector at the entrance aperture 17a of the first section 15a. The light source array 1 may therefore be positioned close to or adjacent (the entrance aperture 17a of) the first section 15a of the tubular reflector.

The arrangements 14, 22 (including the first section 15a, the second section 15b, the light source array 1 and the optical focusing element 21) are thereby are arranged to form a collimated beam of homogeneous color mixed light to be outputted at the exit aperture 18b of the second section 15b.

Figure 5:
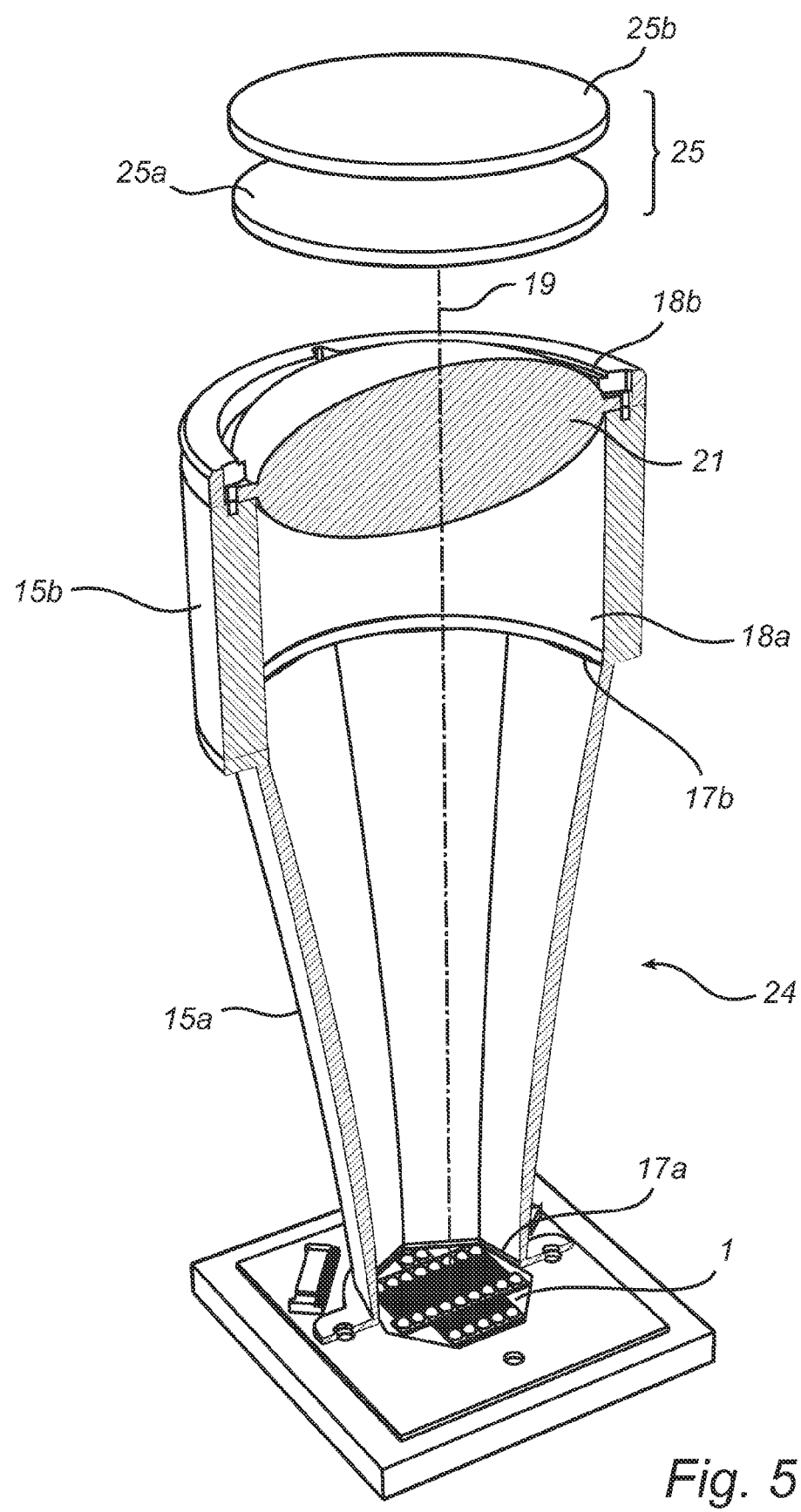

FIG. 5 illustrates an arrangement 24 according to an embodiment. The arrangement 24 of FIG. 5 is similar to the arrangements 14, 22 of FIGS. 3 and 4. Hence the arrangement 22 comprises inter alia a light source array 1, a tubular reflector having a first section 15a and a second section 15b, where each one of the first section 15a and the second section 15b has an entrance aperture 17a, 18a and an exit aperture 17b, 18b, and an optical focusing element 21. An optical axis 19 is formed from the light source array 1 through the optical focusing element 21 towards the exit aperture 18b of the second section 15b.

The arrangement 24 further comprising a lens assembly 25. The lens assembly 25 is arranged to controllably focus/defocus light emitted at the exit aperture 18b of the second section 15b. The lens assembly comprises at least two lenses 25a, 25b arranged in spaced relation to each other. Particularly the lens array 25 may be placed along the optical axis 19 beyond the exit aperture 18b of the second section 15b of the tubular reflector. At least one lens 25a, 25b of the lens assembly 25 is controllably moveable towards and/or away from another lens 25a, 25b of the lens assembly 25 and/or towards the second section 15b of the tubular reflector. Such an arrangement may achieve a high contrast with limited blur and limited colored edges. In more detail, by such an arrangement 24, a zoom lens can substantially be maintained in focus independently of the value of the zoom factor (i.e. the degree of zooming) or even be completely maintained in focus independently of the value of the zoom factor.

Thus, according to one aspect there may be provided a method for controlling an arrangement (or an optical system) as disclosed above, a luminaire and/or a light system comprising at least one arrangement as disclosed above. In other words, an illumination system may comprise a light source array 1, color mixing means, such as the disclosed tubular reflector, and an adjustable optical system (e.g. zoomable and/or (de-)focusable projection system) such as the disclosed lens assembly 25. The optical system may comprise two sections along its optical axis 19; a first segment, such as section 15a and/or section 15b, in which colors are mixed (spatial and angular) and a segment section, such as section 15b and/or lens array 25, in which colors are mixed at all position in the optical system of the second part. The projection system may thereby be controlled by moving the first segment and the second segment in relation to each other such that at any state the projection system projects a focal plane that is within the second segment, in which the colors are mixed, even if the projection system is defocusing to the extremes (i.e. independently of the value of the zoom factor).

According to embodiments the light source array 1 may, furthermore, comprise at least one set of light sources 2 arranged to emit light of a first color and at least one set of light sources 2 arranged to emit light of a second color different from the first color. A set of light sources 2 may be defined by a single light source. Similarly, a set of light sources 2 may comprise two or more light sources arranged together in a group. For example, a set of light sources 2 may be provided in the form of a line of light emitting diodes (LEDs). According to an embodiment the light source comprises a plurality of LEDs. Preferably the light source comprises between 5 and 250 LEDs. More preferably the light source comprises between 20 and 200 LEDs. Even more preferably the light source comprises between 70 and 150 LEDs. Increasing the number of light sources may increase the flux (in lm) of the outputted light. Increasing the number of light sources may also increase the number of different colors obtainable by the arrangement.

According to an embodiment of the invention the light source comprises LEDs of 2-8 different colors. For example, the LEDs may have white (W), red (R), green (G), blue (B), amber (A), cyan (C), deep red (dR) and/or deep blue (dB) emission spectrum. By combination thereof, any desired light spectrum is obtainable that falls within the color space made up by the color coordinates of the WRGBAdRdB starting LEDs. According to an embodiment the light source thus comprises a plurality of colors such as (RGB), (NW+WW), (RGBA), (RGBAW), (RGBW), (RGBAC), (RGBAdR), (RGBACdR), (RGBACdRW), (RGBACdRdB), or the like.

In addition, it may desirable that the light source occupies an area which is as small as possible whilst still allowing a large number of LEDs to be present. It may thus be desirable to have a high densely packed LED array. According to embodiments the plurality of light sources comprises an LED array having an EPI density between 5% and 70%. Preferably the plurality of light sources comprises an LED array having an EPI density between 15% and 50%. Under EPI density is understood the overall area of the light emissive parts of the LEDs with respect to the area of the light source.

Figure 6:
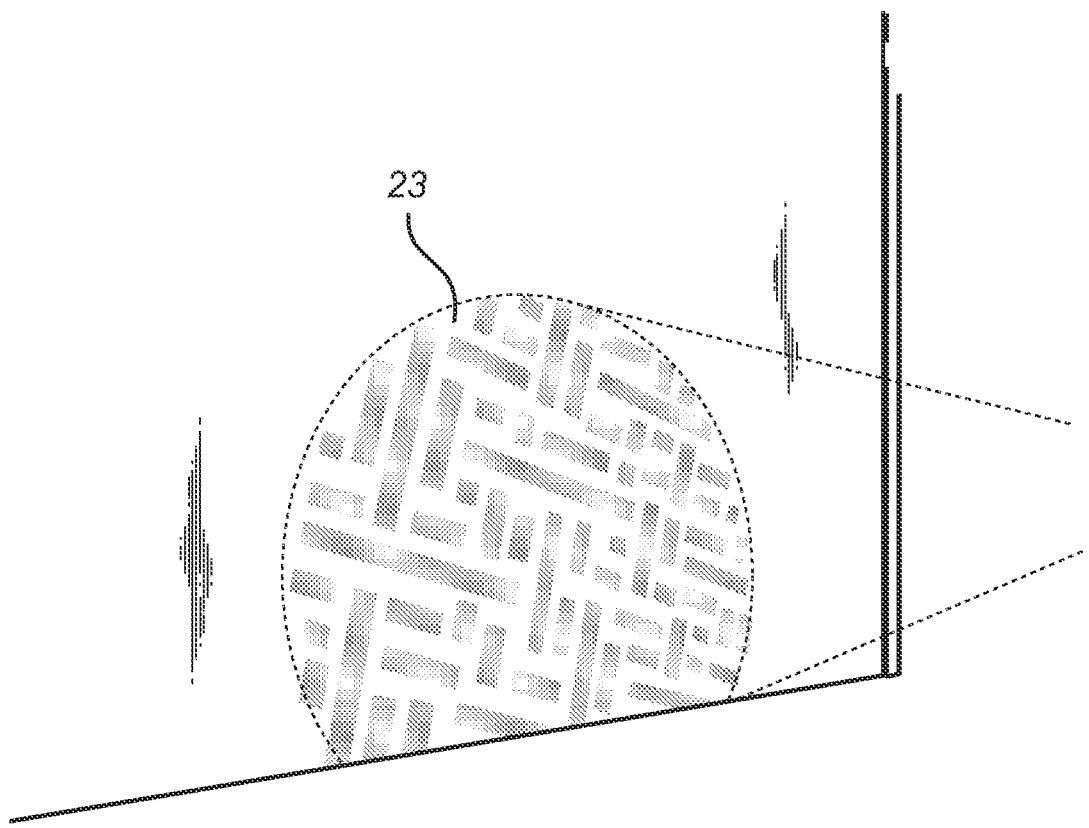
FIG. 6 illustrates an illumination pattern for an arrangement according to an embodiment.

FIG. 6 illustrates an illumination pattern 23 for an arrangement 14, 22 as disclosed with references to FIG. 3 or 4 according to an embodiment. A gobo (or GOBO; derived from "Go Between" or GOes Before Optics originally used on film sets between a light source and the set) is a physical template slotted inside, or placed in front of, a lighting source. A gobo may thereby be used to control the shape of light emitted from a light source and/or illumination system. Such a gobo may be located at the exit of the collimation and color mixing optics of the disclosed arrangements 14, 22. Preferably the gobo is located close to the field or collimation lens and will be projected by an optical projection system attached to the rest of the illumination system on a scene, e.g. on a wall. Alternatively or in addition to the gobo there may be provided a photo mask, a wavelength conversion element and a beam shaping element configured to reflect, refract, absorb and/or diffract light. As a very good color mixing has been achieved at the exit aperture (i.e. close to the field or collimation lens) the illumination pattern shows a sharp pattern 23 without color fringes or collared edges.

In summary there has been disclosed an illumination system for spot illumination. The system comprises a tubular reflector with a reflective inner surface. The tubular reflector comprises two sections; a first sections (preferably with a convex shape as seen from the optical axis of the system) having an entrance aperture and an exit aperture being larger than the entrance apertures and a second sections adjacent to the first sections, the second sections having an entrance aperture and an exit aperture being substantially identical in size. The system further comprises a light source array comprising a plurality of light sources arranged to emit light (preferably of different spectral content and/or different colors) into the first sections of the tubular reflector at the entrance aperture The system further comprises an optical focusing element (such as a field lens) attached to the second sections of the tubular reflector. The light source array, the field lens, the first section and the second sections of the tubular reflector are thereby configured such that a collimated beam enabling homogeneous color mixing (special and angular) in the output light beam is formed.

The person skilled in the art realizes that the present invention by no means is limited to the preferred embodiments described above. On the contrary, many modifications and variations are possible within the scope of the appended claims. For example, the disclosed arrangement may be part of a luminaire. Thus, a luminaire may comprise one or more arrangements as disclosed above. Similarly, the disclosed arrangement may be part of a light system. As noted above, at least one of the plurality of light sources may comprise a solid-state light source such as at least one light-emitting diode (LED). Such a LED may be inorganic or organic. The plurality of light sources may alternatively or optionally comprise one or more compact fluorescence lamps (CFL), high-intensity discharge (HID) lamps and/or halogen lamps. According to the embodiment illustrated in FIG. 5, the lens assembly 25 comprises two lenses 25a, 25b. Embodiments comprising any number of lenses in the lens assembly 25a, 25b, such as three, four, five, six lenses or more or even a single lens are equally envisaged.

The invention claimed is:

1. An arrangement for spot illumination, comprising:
a tubular reflector having a reflective inner surface, said tubular reflector comprising a first section having an entrance aperture and an exit aperture being larger than said entrance aperture, and a second section having an entrance aperture and an exit aperture being substantially identical in size, said entrance aperture of said second section being positioned adjacent said exit aperture of said first section;
a light source array comprising a plurality of light sources arranged to emit light into said first section of said tubular reflector at the entrance aperture of said first section; and
an optical focusing element arranged between the exit aperture of the first section and the exit aperture of the second section of said tubular reflector, wherein said first section, said second section, said light source array and said optical focusing element thereby are arranged to form a collimated beam of homogeneous color mixed light to be outputted at the exit aperture of said second section, wherein an optical axis is formed from said light source array towards said exit aperture of said second section, and wherein said first section has a convex shape relative to said optical axis.

2. The arrangement according to claim 1, wherein said first section comprises multiple facet sidewalls forming a polygonal cross section along said optical axis.

3. The arrangement according to claim 1, wherein said second section has a cylindrical shape as seen from said optical axis.

4. The arrangement according to claim 1, wherein said second section has a cross section shape which corresponds to the cross section shape of said first section.

5. The arrangement according to claim 1, wherein said optical focusing element is positioned between said entrance aperture of said second section and said exit aperture of said first section.

6. The arrangement according to claim 1, wherein said optical focusing element is positioned proximate said exit aperture of said second section of said tubular reflector.

7. The arrangement according to claim 1, wherein said plurality of light sources comprises light sources arranged to emit light of different colors.

8. The arrangement according to claim 1, wherein said plurality of light sources comprises a plurality of LEDs.

9. The arrangement according to claim 1 further comprising a lens assembly arranged to controllably focus/defocus light, said lens assembly comprising at least two lenses arranged in spaced relation to each other, wherein at least one lens of said lens assembly is controllably moveable towards and/or away from another lens of said lens assembly and/or towards said second section of said tubular reflector.

10. A luminaire comprising an arrangement according to claim 1.

11. The arrangement according to claim 1, wherein said plurality of light sources comprises between 5 and 250 LEDs.

12. The arrangement according to claim 11, wherein said plurality of light sources comprises between 70 and 150 LEDs.

13. An arrangement for spot illumination, comprising:
a tubular reflector having a reflective inner surface and comprising a first section having an entrance aperture and an exit aperture being larger than said entrance aperture, and a second section having an entrance aperture and an exit aperture being substantially identical in size, said entrance aperture of said second section being positioned adjacent said exit aperture of said first section;
a light source array comprising a plurality of light sources arranged to emit light into said first section of said tubular reflector at the entrance aperture of said first section; and, an optical focusing element arranged proximate to said second section of said tubular reflector, wherein said first section, said second section, said light source array and said optical focusing element thereby are arranged to form a collimated beam of homogeneous color mixed light to be outputted at the exit aperture of said second section, wherein an optical axis is formed from said light source array towards said exit aperture of said second section and wherein a lens array is placed along said optical axis beyond said exit aperture of said second section of said tubular reflector, wherein an optical axis is formed from said light source array towards said exit aperture of said second section, and wherein said first section comprises multiple facet sidewalls forming a polygonal cross section along said optical axis.

14. The arrangement according to claim 13, wherein said plurality of light sources comprises between 5 and 250 LEDs.

15. The arrangement according to claim 14, wherein said plurality of light sources comprises between 70 and 150 LEDs.

16. The arrangement according to claim 13, wherein said optical focusing element is positioned between said entrance aperture of said second section and said exit aperture of said first section.

17. The arrangement according to claim 13, wherein said plurality of light sources comprises light sources arranged to emit light of different colors.

* * * * *